(12) United States Patent
Hsu et al.

(10) Patent No.: US 11,465,905 B2
(45) Date of Patent: Oct. 11, 2022

(54) CHEMICAL SYNTHESIS METHOD FOR FABRICATING BORON CARBIDE POWDERS

(71) Applicant: National Chung-Shan Institute of Science and Technology, Taoyuan (TW)

(72) Inventors: Wei-Ting Hsu, Taoyuan (TW); Yen-Chung Chen, Taoyuan (TW); Hui-Chun Wang, Taoyuan (TW); Ker-Jer Huang, Taoyuan (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 354 days.

(21) Appl. No.: 16/658,175

(22) Filed: Oct. 21, 2019

(65) Prior Publication Data

US 2021/0114883 A1    Apr. 22, 2021

(51) Int. Cl.
| | |
|---|---|
| *C01B 32/991* | (2017.01) |
| *B01J 21/18* | (2006.01) |
| *B01J 21/02* | (2006.01) |
| *B01J 31/02* | (2006.01) |

(52) U.S. Cl.
CPC ............ *C01B 32/991* (2017.08); *B01J 21/02* (2013.01); *B01J 21/18* (2013.01); *B01J 31/0239* (2013.01); *C01P 2002/72* (2013.01); *C01P 2004/03* (2013.01); *C01P 2004/64* (2013.01); *C01P 2006/80* (2013.01)

(58) Field of Classification Search
None
See application file for complete search history.

(56) References Cited

FOREIGN PATENT DOCUMENTS

| | | | | |
|---|---|---|---|---|
| CN | 100540469 C | * | 9/2009 | |
| CN | 112573520 A | * | 3/2021 | ............. B82Y 30/00 |

OTHER PUBLICATIONS

Wang; CN112573520A, translation provided by Google Mar. 22, 2022.*
Liu et al.; CN100540469, translation provided by Google Mar. 22, 2022.*

* cited by examiner

*Primary Examiner* — Guinever S Gregorio
(74) *Attorney, Agent, or Firm* — Winston Hsu

(57) ABSTRACT

A chemical synthesis method to fabricate boron carbide to obtain boron carbide fine powders includes the steps of: (A) formulating a precursor solution including a boron source, a liquid organic carbon source and a catalyst; (B) subjecting the precursor solution to a pyrolytic reaction in the presence of electromagnetic radiation to obtain a boron carbide precursor; and (C) subjecting the boron carbide precursor to a thermal energy treatment in the presence of thermal energy to obtain boron carbide fine powders.

16 Claims, 4 Drawing Sheets

CHEMICAL SYNTHESIS METHOD FOR FABRICATING BORON CARBIDE POWDERS

BACKGROUND OF THE INVENTION

1. Field of the Invention

The present invention generally relates to a chemical synthesis method for the fabrication of boron carbide powders and fine boron carbide powders. In particular, the present invention is directed to a chemical synthesis method for the fabrication of fine boron carbide powders of high purity and fine boron carbide powders of high purity.

2. Description of the Prior Art

Boron carbide is a lightweight ceramic material of high-hardness. The hardness of boron carbide is only second to diamond and to cubic boron nitride in nature; especially it has near constant high temperature hardness (>30 GPa). In boron carbide, boron atoms and carbon atoms are mainly combined by covalent bonds, so it has high melting point (2450° C.), high hardness, low density (2.52 g/cm$^3$), good wear resistance, strong resistance to acid and alkali substances. However, boron carbide itself has some disadvantages such as low fracture toughness, overly high calcination temperature, poor resistance to oxidation, and poor stability to metals. With the development of powder preparation technology and the development of effective sintering agents, atmospheric pressure sintering of boron carbide becomes possible. The important applications of the boron carbide material include: industrial abrasives, bullet-resistant armor materials, shielding materials for nuclear reactors and absorbent materials for radioactive substances, high temperature thermocouples and additives for solid fuels.

Prior art for boron carbide manufacturing processes includes: carbothermal reduction, self-propagating high temperature synthesis (SHS), mechanical alloy method, solid state diffusion method, laser induced chemical vapor deposition (LICVD), and sol-gel pyrolytic reduction method.

Regarding a conventional technique, such as carbothermal reduction, it usually uses boric acid or boric anhydride as a raw material and carbon as a reducing agent to undergo a high temperature reduction reaction in an electric arc furnace. This method is currently the main domestic and foreign method for preparing industrial B$_4$C, so it is usually the first choice for mass production. However, this method also has some major disadvantages, such as high energy consumption, low production capacity, and great damage to the furnace body at high temperatures. The quality is difficult to maintain and the particle size is large due to the large temperature difference and poor uniformity in the furnace area. A subsequent crushing process is required to result in a higher production cost.

Regarding another conventional technique such as self-propagating high-temperature synthesis (SHS) are the use of reaction heat in the synthesis of a compound to produce a high-purity boron carbide powder. Since the boron carbide powder is prepared by this method, magnesium powder is often used as a fusing agent, so it is also called a magnesiothermal process. The self-propagating high-temperature synthesis method (SHS) has a lower reaction temperature than the conventional carbothermal reduction method. When the system reaches a certain temperature, the reaction can be carried out only by the heat released by the reaction, and the boron carbide powder is synthesized. The purity is higher and the original powder has a finer particle size and generally does not require further crushing treatment. The disadvantage is that the residual magnesium oxide in the reactants must be washed and extremely difficult to remove completely.

Regarding another conventional technique such as mechanical alloy method, it is a new method of combining boron oxide with magnesium thermal reduction. In this process, boron oxide powder, magnesium powder and graphite powder are usually used as raw materials, and the rotation or vibration of the ball mill is used to make the hard ball milling medium strongly collide, grind and stir the raw materials. A temperature slightly higher than room temperature is used to induce the chemical reaction to prepare boron carbide powders. Compared with the traditional magnesiothermal process, the reaction temperature is much lower, but further purification is still needed. There are disadvantages, such as the need to add magnesium powder, accompanied acid wash and concerns about industrial safety and environmental protection.

Regarding another conventional technique, such as direct synthesis, it involves carbon powders and boron powders. After thorough mixing, the reactants are pressed into pellets, and the reaction is carried out under vacuum or an inert atmosphere at a temperature higher than 1500° C. to prepare boron carbide powders. The boron carbide powders which are prepared by the direct synthesis method have higher purity, and it is relatively easy to control the B/C atom ratio in the reaction. The only disadvantage is that the preparation technique of the elemental boron as the raw materials for use in the direct synthesis method is relatively complicated and the cost of the raw material is high. This method has been mostly used in the past only for the preparation of ultrapure or concentrated boron carbide.

Regarding another conventional technique such as laser induced chemical vapor deposition (LICVD), it has disadvantages for example expensive raw materials and low yields.

Regarding another conventional technique such as sol-gel method, compared to the conventional carbothermal reduction methods, the reaction temperature is lower and the boron source loss is less due to the uniform mixing of the boron source and the carbon source then the sol-gel method is used to prepare boron carbide. The boron source used for the reaction is mainly a boron-containing oxide. Therefore, most of the work is done by changing the carbon source. The candidate carbon source includes glycerin, citric acid, starch, glucose and cellulose.

As described above, it is difficult for the conventional methods to achieve a low raw material cost, a stable and rapid process, and to obtain a boron carbide crystal having a uniform high purity because the boron carbide crystal has an uneven particle size and an excessively large size. Therefore, it is still urgent to solve problems such as, how to produce a boron carbide crystal powder of high purity and of a size of submicron scale or less.

SUMMARY OF THE INVENTION

In view of the above disadvantages of prior art, one objective of the present invention is to provide a chemical synthesis method to fabricate boron carbide powders to obtain boron carbide fine powders. Because the chemical synthesis method is carried out in the absence of a magnesium-containing material, the obtained boron carbide fine powders are substantially magnesium-free. Further, the obtained boron carbide fine powders have extremely small particle size.

In view of the above problems of the prior art, the present invention can solve the shortcomings of the conventional manufacturing method, and has the advantages of low raw material cost, and rapid pyrolytic reaction and thermal energy treatment. The amount of boron reacting with carbon, i.e. the atomic boron/carbon ratio, is close to the theoretical ratio of 4:1, which improves the purity of boron carbide fine powders.

In order to achieve the above objectives, according to one aspect proposed by the present invention, a chemical synthesis method to fabricate boron carbide to obtain boron carbide fine powders is provided. The method includes the steps of:
(A) formulating a precursor solution including a boron source, a liquid organic carbon source and a catalyst, (B) subjecting the precursor solution to a pyrolytic reaction in the presence of electromagnetic radiation to obtain a boron carbide precursor, and (C) subjecting the boron carbide precursor to a thermal energy treatment in the presence of thermal energy to obtain boron carbide fine powders.

In the step (A) of the above chemical synthesis method, the boron source is selected from a group consisting of ammonia borane, a borane, metaboric acid, a boron oxide, boric acid and a boron halide, the liquid organic carbon source is selected from a group consisting of an organic acid and an alcohol, and the catalyst is selected from a group consisting of nano-carbon, graphene, graphite powder, nano-boron oxide and a quaternary ammonium compound.

In the step (B) of the above chemical synthesis method, the electromagnetic radiation is microwave vacuum radiation of a power in a range of 800 W-1000 W at a temperature of 350° C.-700° C. for 10 minutes to 50 minutes. In the step (C) of the above chemical synthesis method, the thermal energy treatment is selected from a group consisting of atmosphere calcination, high-frequency calcination and microwave calcination. The atmosphere calcination is carried out in the presence of an inert gas at a temperature of 1200° C.-1600° C. for 1 hour to 5 hours. The high-frequency calcination is carried out in the presence of an inert gas and oscillation frequency not less than 100 kHz at a temperature of 1200° C.-1600° C. for 1 hour to 5 hours. The microwave calcination is carried out in the presence of a protective gas. A power for the microwave calcination is in a range of 1500 W-2200 W at a temperature of 1200° C.-1600° C. for 1 hour to 5 hours.

According to another aspect proposed by the present invention, the chemical synthesis method may obtain novel boron carbide fine powders. The boron carbide fine powders may have a D50 particle size not greater than 0.5 μm. The boron carbide fine powders may also have a mean particle size not greater than 100 nm. The boron carbide fine powders may have purity not less than 95%. The boron carbide fine powders may have an oxygen atomic content less than 3%. The boron carbide fine powders may have a magnesium atomic content less than 1%.

The present invention proposes a chemical synthesis method to fabricate boron carbide fine powders so as to obtain novel boron carbide fine powders. The present invention uses a boron source, a liquid organic carbon source and a catalyst in the absence of a magnesium-containing material by a preliminary pyrolytic reaction and a subsequent thermal energy treatment to result in boron carbide fine powders of high purity and of extremely small particle size. The chemical synthesis method to fabricate the boron carbide fine powders has various advantages over conventional processes. The boron carbide fine powders which are obtained from the chemical synthesis method of the present invention have high purity, high quality and a smaller D50 particle size not greater than 0.5 μm so the boron carbide fine powders are also novel and have chemical or physical features which are not obvious over the boron carbide powders made from prior art.

These and other objectives of the present invention will no doubt become obvious to those of ordinary skill in the art after reading the following detailed description of the preferred embodiment that is illustrated in the various figures and drawings.

DETAILED DESCRIPTION

Specific embodiments are provided to elaborate the details of the present invention. The advantages and efficacy thereof would be readily appreciated by persons of ordinary skill in the art from the disclosure of the present invention.

Figure 1:
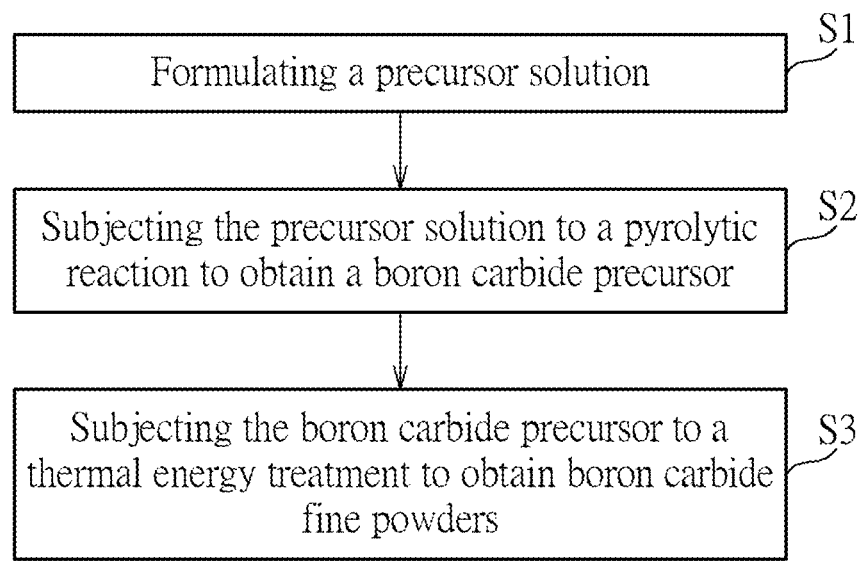
FIG. 1 is a flow chart of a chemical synthesis method for the fabrication of boron carbide powders of the present invention.

Please refer to FIG. 1, which is a flow chart of a chemical synthesis method for the fabrication of boron carbide powders of the present invention. The method may solve the problems of prior art by using low cost row materials and by providing boron carbide powders with the B:C atomic ratio close to 4:1. The method of the present invention includes the steps of:
(A) formulating a precursor solution including a boron source, a liquid organic carbon source and a catalyst (S1);
(B) subjecting the precursor solution to a pyrolytic reaction in the presence of electromagnetic radiation to obtain a boron carbide precursor (S2); and
(C) subjecting the boron carbide precursor to a thermal energy treatment in the presence of thermal energy to obtain boron carbide fine powders (S3).

The precursor solution in the step (S1) of the present invention provides the inexpensive main components for the chemical synthesis method of boron carbide powders. The precursor solution is formulated in a chemical pre-treatment mixing procedure by mixing suitable components. The precursor solution includes at least a boron source, a liquid organic carbon source and a catalyst for the fabrication of boron carbide powders. In particular, the precursor solution is substantially magnesium-free to yield boron carbide powders of high purity.

The boron source may be selected from a group consisting of inorganic boron compounds, such as ammonia borane, a borane, metaboric acid, a boron oxide, boric acid and a boron halide. The boron halide may be boron chloride ($BCl_3$). The boron source preferably may be $B_2O$ for its smaller molecular weight, or a borane such as diborane or trialkylborane for better reaction completion, but the present invention is not limited to these.

The liquid organic carbon source may serve as both a solvent for the boron source and the catalyst, and a carbon source for the boron carbide powders. The liquid organic carbon source may be an organic solvent, such as selected from a group consisting of an organic acid and an alcohol. The organic acid, for example, may be formic acid, acetic acid or a mixture thereof. The alcohol may be methyl alcohol, ethyl alcohol, ethylene glycol, propylene glycol, glycerol, isopropanol, 1-butanol, 2-methyl-1-propanol, 2-butanol, 2-methyl-1-propanol or a mixture thereof. The liquid organic carbon source may be an aqueous solution.

The catalyst may serve as seed for boron carbide crystallization or is helpful to make the boron carbide particle size smaller. The catalyst may be selected from a group consisting of nano-carbon, graphene, graphite powder, nano-boron oxide and a quaternary ammonium compound. The catalyst, such as nano-carbon or graphene, may have a D50 particle size not greater than 0.1 µm. Preferably for better application, the catalyst, such as nano-boron oxide, may have a D50 particle size not greater than 0.1 µm to facilitate better growth of crystallization. The weight of the catalyst may be not greater than 5% of the total weight of the precursor solution. The quaternary ammonium compound, such as a tetramethylammonium compound, may be a salt of an organic acid, such as a formic acid salt, an acetic acid salt or a mixture thereof. The quaternary ammonium salt may be helpful to adjust the pH value of the precursor solution to a suitable range. The catalyst may be a carbon-containing component or a boron-containing component of a very small particle size, such as in nano-scale.

To formulate the precursor solution, it is possible to first disperse the boron source in the liquid organic carbon source by mixing the boron-carbon mixture in a suitable ratio, then the catalyst is introduced into and well dispersed in the boron-carbon mixture by ultrasonic oscillating. Because the catalyst may be a carbon-containing component or a boron-containing component, a suitable ratio of B:C of the boron source, the catalyst and the liquid organic carbon source in total may be in the range of 3.5:1 to 4.5:1 so the ratio of (boron source):(liquid organic carbon source) is variable depending on the B:C ratio of the components in total in the precursor solution. After the step (S1), a suitable precursor solution is formulated.

Next, in the step (S2) the formulated precursor solution is subjected to a pyrolytic reaction. Pyrolysis is a thermochemical reaction to undergo a thermal decomposition. The pyrolytic reaction helps the precursor solution initiate the chemical synthesis method to yield a concentrated boron-carbon mixture from the boron source, the catalyst and the liquid organic carbon source. A suitable electromagnetic radiation condition may facilitate the pyrolytic reaction to obtain a boron carbide precursor by reaching a thermal cracking degradation temperature to decompose the molecules to elements. In other words, the pyrolytic reaction may be carried out in the presence of a suitable electromagnetic radiation condition. The electromagnetic radiation may be microwave vacuum radiation to carry out the pyrolytic reaction. For example, the electromagnetic radiation may have a power in a range of 800 W-1000 W, preferably 900 W for example. The pyrolytic reaction may be carried out at a temperature of 350° C.-700° C., preferably 500° C.-550° C. for example, for 10 minutes to 50 minutes, preferably about 40 minutes for example, to provide the pyrolytic reaction with sufficient energy to concentrate the boron source and the liquid organic carbon source. The pyrolytic reaction may activate the precursors, such as the boron source and the liquid organic carbon source, to decompose the molecules to elements such as C, N, O and further to concentrate the precursors to bring the elements in the precursors even much closer.

The pyrolytic reaction is possible to be carried out in two different steps, such as a preliminary step followed by a subsequent step. For example, the preliminary step may be carried out in the presence of preliminary electromagnetic radiation, with a power in a range of 800 W-900 W at a temperature of 350° C.-500° C. for 10 minutes to 30 minutes, followed by the subsequent step in the presence of subsequent electromagnetic radiation with a power in a range of 900 W-1000 W at a temperature of 500° C.-700° C. for 20 minutes to 40 minutes. In other words, the subsequent step may be preferably carried out in a condition stronger than that of the preliminary step. After the pyrolytic reaction in the step (S2), the boron-carbon mixture is concentrated to a solid boron carbide precursor.

Subsequently, the solid boron carbide precursor is subjected to a thermal energy treatment to obtain the boron carbide fine powders of the present invention. The thermal energy treatment preferably has a treatment condition stronger than that of the pyrolytic reaction to make the solid boron carbide precursor crystallized to form boron carbide crystals. The thermal energy treatment may be carried out in the presence of suitable thermal energy, for example under a temperature not lower than 1200° C., to obtain the boron carbide fine powders of the present invention of high purity and of smaller particle size.

The thermal energy treatment may be carried out in different ways, for example one of atmosphere calcination, high-frequency calcination or microwave calcination. In a first embodiment of the present invention, the thermal energy treatment may be the atmosphere calcination. For the atmosphere calcination, the treatment condition may be carried out in the presence of an inert gas at a temperature of 1200° C.-1600° C. for 1 hour to 5 hours. The inert gas may be selected from a group consisting of argon gas, helium gas and nitrogen gas. Preferably, the atmosphere calcination may be carried out at a temperature of 1500° C. for 3 hours, but the present invention is not limited to these.

In a second embodiment of the present invention, the thermal energy treatment may be the high-frequency calcination. For the high-frequency calcination, the treatment condition may be carried out in the presence of an inert gas and in the presence of oscillation frequency not less than 100 kHz at a temperature of 1200° C.-1600° C. for 1 hour to 5 hours. The inert gas may be selected from a group consisting of argon gas, helium gas and nitrogen gas. Preferably, the high-frequency calcination may be carried out at a temperature of 1400° C. for 3 hours, but the present invention is not limited to these.

In a third embodiment of the present invention, the thermal energy treatment may be the microwave calcination. For the microwave calcination, the treatment condition may be carried out in the presence of a protective gas at a temperature of 1200° C.-1600° C. for 1 hour to 5 hours with a microwave power in a range of 1500 W-2200 W. The protective gas may be selected from a group consisting of argon gas, helium gas and nitrogen gas. Preferably, the microwave calcination may be carried out at a temperature of 1450° C. for 3 hours with a microwave power of 1700 W, but the present invention is not limited to these.

After the above steps, the boron carbide fine powders of the present invention are obtained. The boron carbide fine powders which are obtained by the chemical synthesis method of the present invention may have various advantageous physicochemical properties or features. For example, in a first aspect the boron carbide fine powders may have a D50 particle size not greater than 0.5 µm. In a second aspect, the boron carbide fine powders may have a mean particle size not greater than 100 nm. Ina third aspect, the boron carbide fine powders may have purity not less than 95%. In a fourth aspect, the boron carbide fine powders may have an oxygen atomic content less than 3%. Ina fifth aspect, the boron carbide fine powders may have a magnesium atomic content less than 1%. These various advantageous physicochemical properties are not obvious over the boron carbide powders made from prior art.

Figure 2:
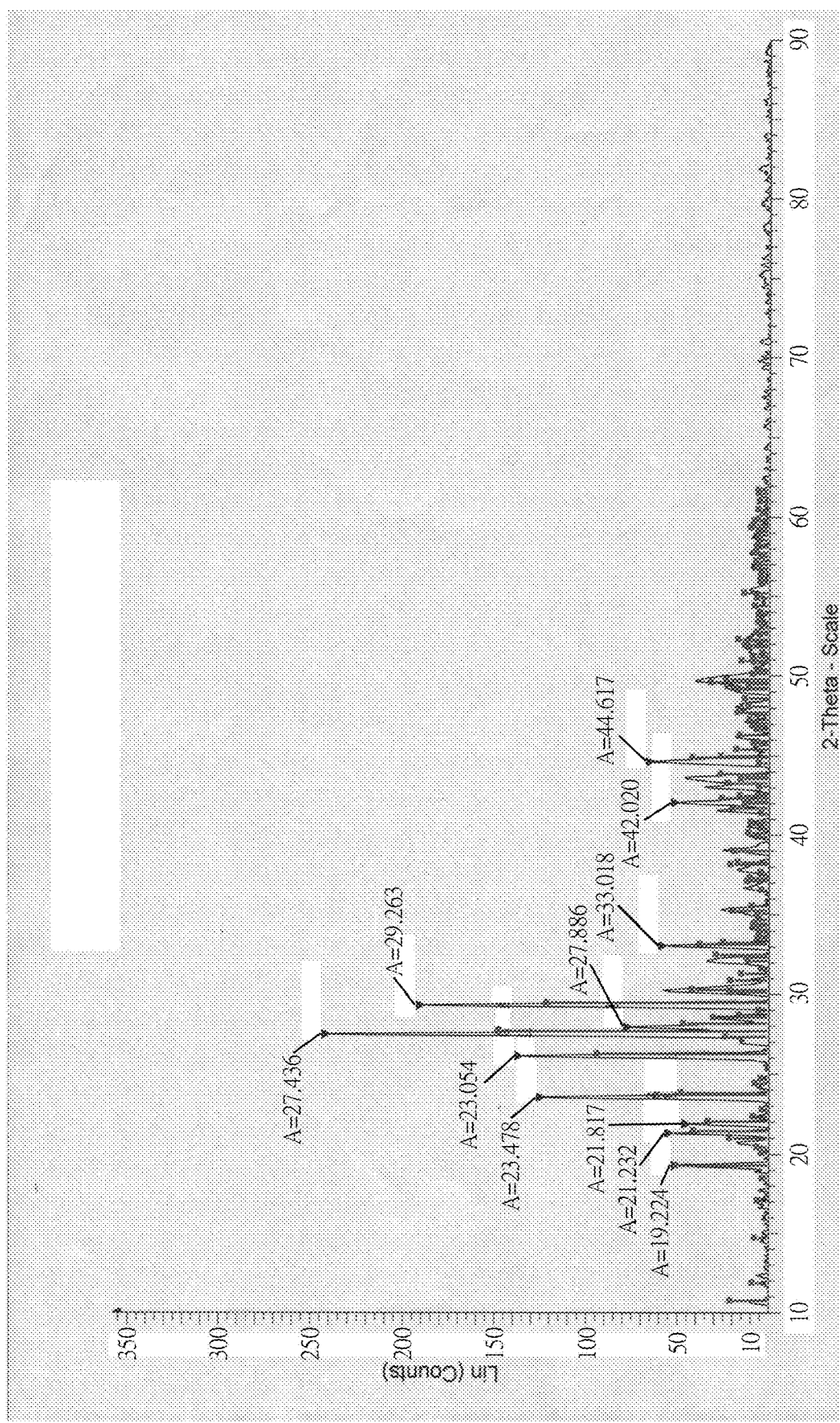
FIG. 2 illustrates an XRD pattern of the boron carbide precursor according to the chemical synthesis method of the present invention.
Figure 3:
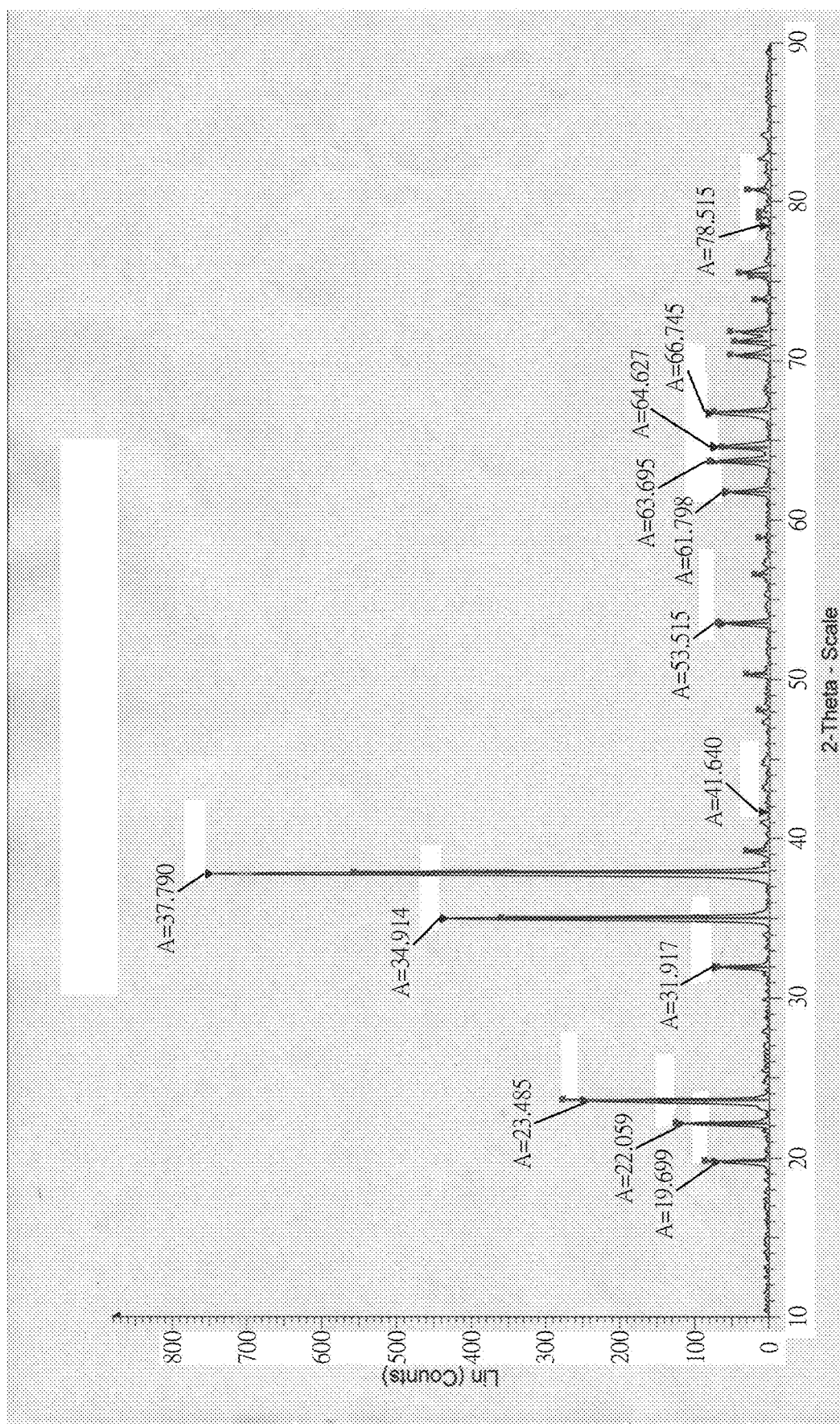
FIG. 3 illustrates an XRD pattern of the boron carbide according to the chemical synthesis method of the present invention.
Figure 4:
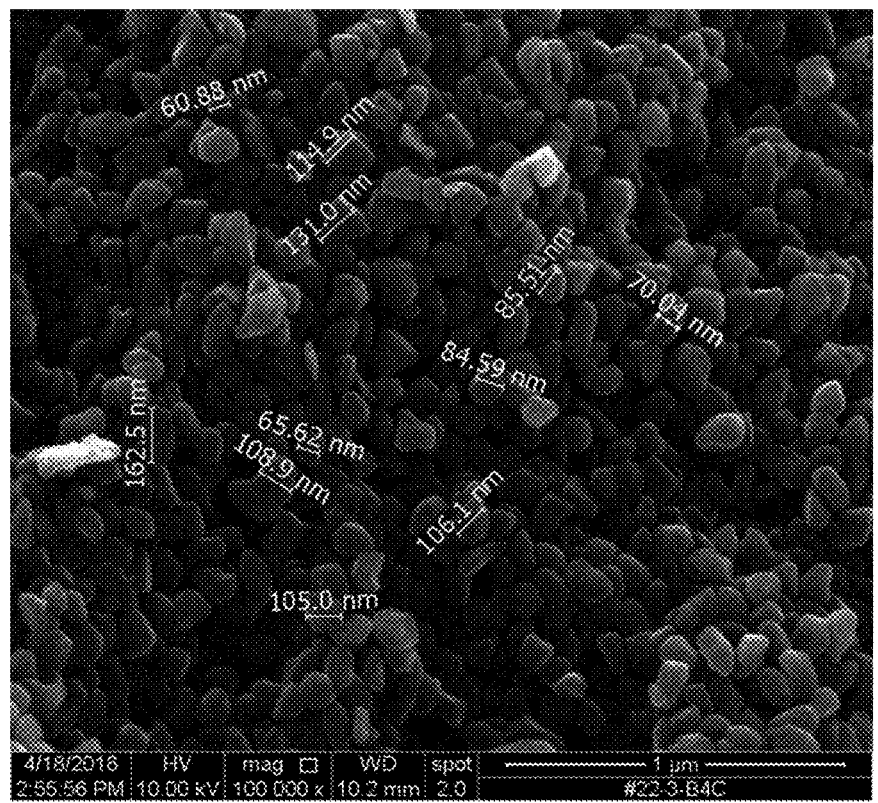
FIG. 4 illustrates an SEM image of the boron carbide powders according to the chemical synthesis method of the present invention.

Please refer to FIG. 2. FIG. 2 illustrates an XRD pattern of the boron carbide precursor according to the chemical synthesis method of the present invention. Please refer to FIG. 3. FIG. 3 illustrates an XRD pattern of the boron carbide powders according to the chemical synthesis method of the present invention. Please refer to FIG. 4. FIG. 4 illustrates an SEM image of the boron carbide powders according to the chemical synthesis method of the present invention. It is observed in FIG. 4 that some examples of the particle diameter of the boron carbide powders of the present invention are 60.88 nm, 65.62 nm, 70.04 nm, 84.59 nm, 85.51 nm, 105.0, 106.1 nm, 108.9 nm, 114.9 nm, 131.0 nm and 162.5 nm (the longer diameter). The mean size of these boron carbide particles is 99.55 nm so the mean particle size is not greater than 100 nm and none of the particle size is greater than 0.5 µm.

The chemical synthesis method for the fabrication of boron carbide powders of the present invention may have one or more advantages and unexpected results, such as:

(1) The chemical synthesis method for the fabrication of boron carbide powders of the present invention utilize the microwave vacuum radiation on the precursor solution to expedite the pyrolytic cracking reaction to result in both shorter reaction time than that of the traditional method and better uniformity of the pyrolytic reaction; and (2) The chemical synthesis method for the fabrication of boron carbide powders of the present invention can improve the reaction rate of the manufacturing process by the catalyst through the atmosphere calcination, the high-frequency calcination, or the microwave vacuum irradiation on the reaction to yield most crystal nucleus and best dispersion so the boron carbide crystals are uniformly formed in a well dispersed state in order to reduce the particle size of the boron carbide powders.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A chemical synthesis method to fabricate boron carbide powders, comprising:
   (A) formulating a precursor solution comprising a boron source, a liquid organic carbon source and a catalyst;
   (B) subjecting the precursor solution in the absence of a magnesium-containing material to a pyrolytic reaction in the presence of electromagnetic radiation to obtain a boron carbide precursor; and
   (C) subjecting the boron carbide precursor to a thermal energy treatment in the presence of thermal energy to obtain boron carbide fine powders.

2. The chemical synthesis method to fabricate boron carbide powders according to claim 1, wherein the boron source is selected from a group consisting of ammonia borane, a borane, metaboric acid, a boron oxide, boric acid and a boron halide.

3. The chemical synthesis method to fabricate boron carbide powders according to claim 1, wherein the liquid organic carbon source is selected from a group consisting of an organic acid and an alcohol.

4. The chemical synthesis method to fabricate boron carbide powders according to claim 1, wherein the catalyst is selected from a group consisting of nano-carbon, graphene, graphite powder, nano-boron oxide and a quaternary ammonium compound and the catalyst has a D50 particle size not greater than 0.1 µm.

5. The chemical synthesis method to fabricate boron carbide powders according to claim 1, wherein a weight of the catalyst is not greater than 5% of a total weight of the precursor solution.

6. The chemical synthesis method to fabricate boron carbide powders according to claim 1, wherein the electromagnetic radiation is microwave vacuum radiation of a power in a range of 800 W-1000 W at a temperature of 350° C.-700° C. for 10 minutes to 50 minutes.

7. The chemical synthesis method to fabricate boron carbide powders according to claim 6, wherein the microwave vacuum radiation is performed in a first step at a first temperature followed by a second step at a second temperature not lower than the first temperature.

8. The chemical synthesis method to fabricate boron carbide powders according to claim 1, wherein the thermal energy treatment is selected from a group consisting of atmosphere calcination, high-frequency calcination and microwave calcination.

9. The chemical synthesis method to fabricate boron carbide powders according to claim 8, wherein the atmosphere calcination is carried out in the presence of an inert gas at a temperature of 1200° C.-1600° C. for 1 hour to 5 hours.

10. The chemical synthesis method to fabricate boron carbide powders according to claim 8, wherein the high-frequency calcination is carried out in the presence of an inert gas and of oscillation frequency not less than 100 kHz at a temperature of 1200° C.-1600° C. for 1 hour to 5 hours.

11. The chemical synthesis method to fabricate boron carbide powders according to claim 8, wherein the microwave calcination is carried out in the presence of a protective gas and of a power in a range of 1500 W-2200 W at a temperature of 1200° C.-1600° C. for 1 hour to 5 hours.

12. The chemical synthesis method to fabricate boron carbide powders according to claim 1, wherein the boron carbide fine powders have a D50 particle size not greater than 0.5 µm.

13. The chemical synthesis method to fabricate boron carbide powders according to claim 1, wherein the boron carbide fine powders have a mean particle size not greater than 100 nm.

14. The chemical synthesis method to fabricate boron carbide powders according to claim 1, wherein the boron carbide fine powders have purity not less than 95%.

15. The chemical synthesis method to fabricate boron carbide powders according to claim 1, wherein the boron carbide fine powders have an oxygen atomic content less than 3%.

16. The chemical synthesis method to fabricate boron carbide powders according to claim 1, wherein the boron carbide fine powders have a magnesium atomic content less than 1%.

* * * * *